Sept. 15, 1959     H. H. WORTH     2,904,230
COFFEE DISPENSER
Filed April 30, 1958
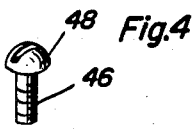
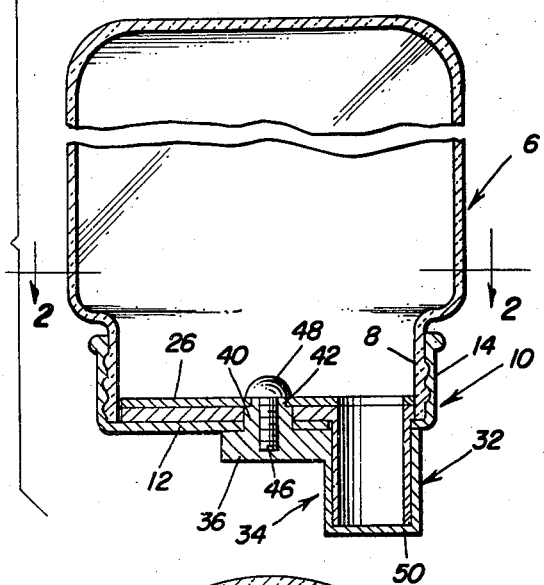
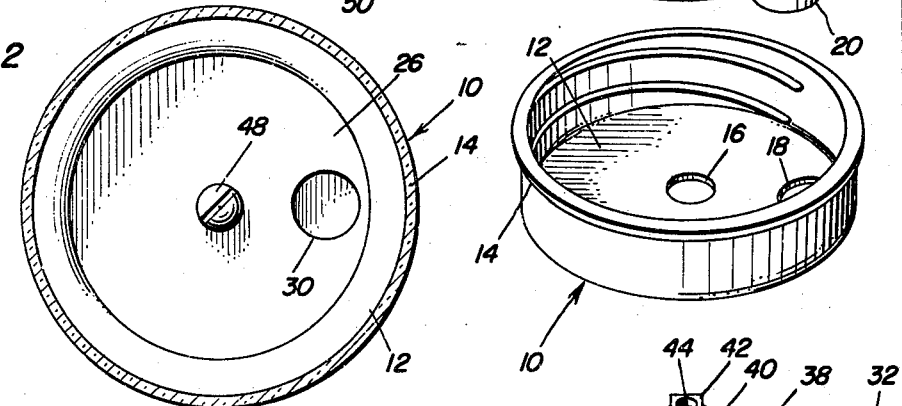
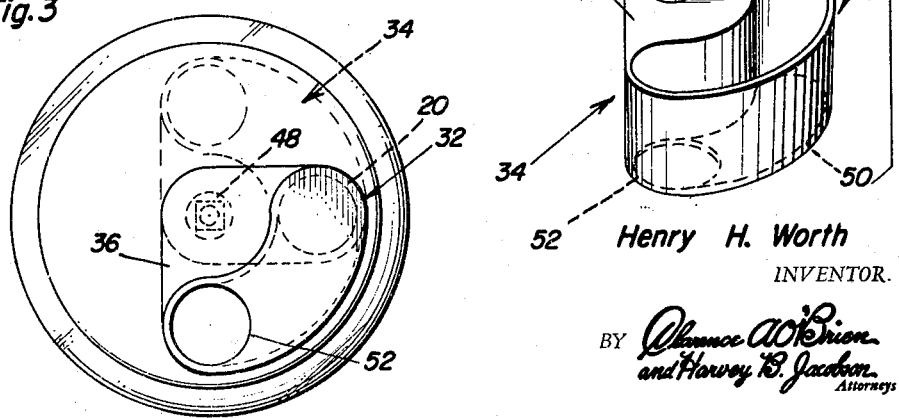
Henry H. Worth
INVENTOR.

2,904,230
COFFEE DISPENSER

Henry H. Worth, Detroit, Mich.

Application April 30, 1958, Serial No. 732,062

2 Claims. (Cl. 222—452)

The present invention relates to certain new and useful improvements in a container and dispenser which is expressly constructed and designed to contain and deliver a measured amount of granular material, for example, sugar, coffee and the like.

Although an invention of this type is suitable and practical for use in restaurants and similar eating places it was devised with the thought in mind of use primarily in the home and particularly for measuring instant coffee to be delivered directly into the cup and to thus expedite the making of coffee in a highly satisfactory manner.

As the preceding generalized description of the subject matter of the invention reveals dispensers for a measured amount of sugar, coffee, tea and the like are old and well known. As a matter of fact, it is known to be old in the art to provide a measuring dispenser which is attachable to the neck of a jar, this being mentioned here because the present invention has to do with dispensing means which is cooperatively mounted on and carried by a screw cap such as is used on the neck of the jar. It follows that it is an object of the instant concept to structurally, functionally and otherwise improve upon similarly constructed and performing jar-type and equivalent containers and dispensers and, in doing so, to provide an improved construction in which manufacturers will find their manufacturing requirements and economies met, and users will find their needs for home use successfully met.

Briefly summarized, the invention in a preferred embodiment thereof, comprises a glass or an equivalent jar such as is currently used as a container, for example, for instant coffee. A screw cap which corresponds to the usual screw cap provided on such jars is provided. However, the attachable cap is modified to adapt itself for cooperation therewith of the components which go to make up the novel valving and measuring means which distinguishes the instant invention as an advance in the art.

Other objects, features and advantages of the invention will become more readily apparent from the following description and the accompanying illustrative, but not restrictive, drawing.

In the drawing, wherein like numerals are employed to designate like parts throughout the views:

Fig. 1 is a view in section with the jar contracted, showing the improved cap and how it cooperates with the neck of the jar in providing the aforementioned material containing, measuring and dispensing device;

Fig. 2 is a cross section on the line 2—2 of Fig. 1;

Fig. 3 is a bottom plan view showing the valving means closed; and

Fig. 4 is an exploded perspective view showing all of the individual parts or components which are employed in perfecting the measuring and dispensing device.

With reference now to Fig. 1 the container comprises a transparent or equivalent jar 6. As already revealed this is the type of a jar which is currently employed in commercializing instant coffee for use, as is primarily the case, in the home. The customary screw-threaded neck is denoted by the numeral 8. The jar is shown in an inverted position to disclose how under ordinary circumstances one uses the measuring dispenser. The customary screw cap (not shown) is removed and replaced by the improved cap. This cap is denoted by the numeral 10 in Fig. 4 and comprises the customary disk or diaphragm 12 and a complemental screw-threaded rim 14. As distinguished from the ordinary cap it will be evident that the cap 10 is provided at its center with a circular hole 16 of predetermined size. Eccentrically it is provided with a larger hole 18 through and beyond which the discharge neck 20 extends. The neck is an integral part of and depends laterally from a marginal portion of a flat circular plate 22, said plate provided at its center with a hole or opening 24 corresponding and aligned with the hole 16. The plate 22 is of a diameter that it fits properly within the receptacle portion of the cap in the manner shown perhaps best in Fig. 1. Superimposed on the plate or disk 22 there is a second similar disk 26 having a square hole 28 at the center and a circular hole 30 eccentrically arranged and providing a valving port. In fact this part 26 is referred to herein as a valving disk. Normally, when the valve is closed as seen in Fig. 1 the valving port or hole 30 registers with the neck 20 and the neck extends down through the hole 18 and into a segmental receiver or well 32. The well is an integral part of the control unit 34 which includes a hub portion 36 provided at its top 38 with an upstanding journal 40 terminating in a reduced extension 42 screw threaded at 44 and providing a nut. This nut and journal also has a screw threaded bore to accommodate the shank 46 of the assembling screw 48. In practice the journal is passed up and through the aligned holes 16 and 24 and the non-circular or square hole 28 fits about the nut thus providing a keying and operating connection between the control unit 34 and valving disk. It follows that the neck-equipped plate 22 is sandwiched between the valving disk 26 and the diaphragm portion 28 of the screw cap 10. The control unit is disposed exteriorly of the screw cap and is movable in a limited arcuate path through approximately 90° as is evident from the full and phantom line illustration seen in Fig. 3. Reverting to the receiver it will be seen that this is of course aligned with and telescopically receives the cooperating portion of the measuring spout or neck 20. The major portion of the bottom of the receiver or well is imperforate as denoted at 50. At one end there is a discharge hole or opening 52 which when it is aligned with the spout permits the coffee (not shown) in the jar to gravitate into a drinking cup, or spoon or the like in an obvious manner.

It will be evident that so long as the imperforate portion 50 covers the otherwise open discharge end of the spout or neck 20, the measured amount of coffee is retained in the neck ready for delivery. This is so because in the normal closed position, the port 30 registers with the neck allowing the coffee in the jar to pre-load the neck. By switching or moving the control unit 34 from the left full line position seen in Figure 3 to the phantom line position shown in the same figure it will be evident that the parts then cooperate to uncover the charge or load of coffee. That is to say the discharge opening 52 is now in line with the neck and consequently the measured amount of coffee may be conveniently dispensed. At the same time the valve disk 26 has moved over and closes the intake end of the neck.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A measuring type of dispenser attachable to the screw-threaded neck of an instant coffee jar or the like comprising a screw cap having a diaphragm portion and a screw-threaded rim portion, said diaphragm portion having a central hole and an eccentric hole, a disk-like plate superimposed upon said diaphragm portion and having a hole in alignment with the first named hole and having a depending neck extending downwardly through and beyond the eccentric hole, said neck being of a predetermined cross-section and length, a disk-like plate superimposed on said first named plate and having a hole of prescribed size eccentrically arranged and aligned with the hole in said first named plate and also with said neck, and provided centrally with a non-circular hole in alignment with the centrally arranged holes in said diaphragm portion and first named plate, said second named plate constituting a valving disk, a control unit having a hub portion contacting the diaphragm portion and provided with an upstanding journal, said journal passing upwardly and rotatably through the openings in the diaphragm portion of the first named plate, and being provided on its upper end with a nut, said nut being fitted and keyed in the opening at the center of said second named plate, and fastening means carried by said nut and journal and serving to operatively join and assemble all of the parts named, and said control unit having a receiver which is segmental in plan and into which said neck is telescopically fitted, said receiver having a bottom portion which normally closes the discharge end of said neck and being provided at one end with a discharge opening which may be aligned with the discharge end of the neck.

2. A measuring type of dispenser attachable to the screw-threaded neck of an instant coffee jar or the like comprising a cap having a diaphragm portion and a rim portion, said diaphragm portion having a central hole and an eccentric hole, a disk-like plate superimposed upon said diaphragm portion and having a hole in alignment with the first named hole and having a depending neck extending downwardly through and beyond the eccentric hole, said neck being of a predetermined cross-section and length, a disk-like plate superimposed on said first named plate and having a hole of prescribed size eccentrically arranged and aligned with the hole in said first named plate and also with said neck, and provided centrally with a non-circular hole in alignment with the centrally arranged holes in said diaphragm portion and first named plate, said second named plate constituting a valving disk, a control unit having a hub portion contacting the diaphragm portion and provided with an upstanding journal, said journal passing upwardly and rotatably through the openings in the diaphragm portion of the first named plate, and being provided on its upper end with a nut, said nut being fitted and keyed in the opening at the center of said second named plate, and fastening means carried by said nut and journal and serving to operatively join and assemble all of the parts named, and said control unit embodying a receiver into which said neck projects for cooperation with the receiver, said receiver having a bottom spanning and normally closing the discharge end of said neck, said bottom being provided at a prerequisite position with the discharge opening which may be moved from one position to another position in order that the discharging opening may be caused to be in and out of alignment with the discharge end of said neck.

References Cited in the file of this patent

UNITED STATES PATENTS

| | | |
|---|---|---|
| 928,502 | Hirsch | July 13, 1909 |
| 1,658,257 | Rogginger | Feb. 7, 1928 |
| 2,024,023 | Beach | Dec. 10, 1935 |